(12) United States Patent
Marzolla et al.

(10) Patent No.: US 7,674,731 B2
(45) Date of Patent: *Mar. 9, 2010

(54) FIBRES MADE FROM COPOLYMERS OF PROPYLENE AND HEXENE-1

(75) Inventors: Roberta Marzolla, Occhiobello (IT); Enrico Beccarini, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 758 days.

This patent is subject to a terminal disclaimer.

(21) Appl. No.: 10/581,982

(22) PCT Filed: Dec. 16, 2004

(86) PCT No.: PCT/EP2004/014340

§ 371 (c)(1), (2), (4) Date: Jun. 7, 2006

(87) PCT Pub. No.: WO2005/059210

PCT Pub. Date: Jun. 30, 2005

(65) Prior Publication Data

US 2007/0092723 A1  Apr. 26, 2007

(30) Foreign Application Priority Data

Dec. 19, 2003 (EP) .................. 03029381

(51) Int. Cl.
*D04H 1/00* (2006.01)
*D04N 3/00* (2006.01)

(52) U.S. Cl. .............. 442/365; 442/327; 442/333; 442/361; 442/398; 442/416; 428/296.7

(58) Field of Classification Search .............. None
See application file for complete search history.

(56) References Cited

U.S. PATENT DOCUMENTS

| 4,399,054 A | 8/1983 | Ferraris et al. |
| 4,472,524 A | 9/1984 | Albizzati |
| 2003/0130436 A1* | 7/2003 | Zucchelli ............. 525/333.3 |
| 2004/0058802 A1* | 3/2004 | Knoeppel et al. ......... 502/102 |
| 2005/0106978 A1* | 5/2005 | Cheng et al. ............ 442/327 |

FOREIGN PATENT DOCUMENTS

| EP | 45977 | 2/1982 |
| EP | 361493 | 4/1990 |
| EP | 728769 | 8/1998 |
| EP | 782587 | 2/1999 |
| WO | 95/32091 | 11/1995 |
| WO | 96/27041 | 9/1996 |
| WO | 00/34385 | 6/2000 |
| WO | 00/63471 | 10/2000 |

OTHER PUBLICATIONS

Friedelm Hauser, "Plastics Extrusion Technology," chp. 17 (1988.) Hauser Publishers.
M. Ahmed, Polyproplyene fibres science and technology, p. 344-346 (1982.) Elsevier Scientific Publishing Company.

* cited by examiner

*Primary Examiner*—David R Sample
*Assistant Examiner*—Nicole T Gugliotta
(74) *Attorney, Agent, or Firm*—William R. Reid

(57) ABSTRACT

A fiber for thermal bonding comprising semicrystalline random copolymers of propylene, 1-hexene and optionally another α-olefin, the amount of 1-hexene being from 0.75 to less 1.52 mol % (i.e. 1.5 to less than 3 wt %) with respect to the total weight of the copolymer. The said copolymers possess a value of melt flow rate (MFR) ranging from 4 to 35 g/10 min and a molecular weight distribution, in terms of the ratio between weight average molecular weight and numeric average molecular weight ($\overline{M}_w/\overline{M}_n$), ranging from 4 to 12.

9 Claims, No Drawings

FIBRES MADE FROM COPOLYMERS OF PROPYLENE AND HEXENE-1

This application is the U.S. national phase of International Application PCT/EP2004/014340, filed Dec. 16, 2004, claiming priority to European Patent Application 03029381.5 filed Dec. 19, 2003; the disclosures of International Application PCT/EP2004/014340, and European Patent Application 03029381.5, each as filed, are incorporated herein by reference.

The present invention relates to fibres made from semicrystalline random copolymers of propylene with 1-hexene. In particular, it concerns fibres for thermal bonding application.

Within the definition of fibres are also included the manufactured products similar to fibres, such as fibrils and cut filaments (staple fibres).

The fibres of the present invention are particularly adequate for use in application where a good balance of tenacity, elongation at break and bonding force is required. For examples, staple fibres are useful in the manufacture of felt for markers and pens, in non-woven fabrics for geotextiles, cement reinforcements and in supports for synthetic leather.

Fibres comprising semicrystalline copolymers of propylene with a low content of 1-hexene are already known.

International patent application WO 96/27041 discloses fabrics with a very pleasing hand. Said performance is obtained with fibres made from copolymers of propylene and an α-olefin, such as ethylene, 1-butene and 1-hexene. The disclosed fibres are suited for spunbonded fabrics.

International patent application WO 00/63471 discloses thermally bondable fibres comprising copolymer of propylene and a superior α-olefin, the latter being in amounts of at least 3 wt % with respect to the total copolymer. The exemplified fibres show to possess a good balance of mechanical properties, in particular tenacity, elongation at break and bonding force. However, the document provides concrete disclosure of fibres only made up of copolymers of propylene and 1-butene in amounts of at least 4.5 mol %, the disclosed fibres exhibit a good balance of properties due to a high degree of modification of the polymer.

Now it has surprisingly been found that a good balance of mechanical properties can also be obtained in fibres made from semicrystalline random copolymers of propylene with 1-hexene having a low degree of modification of the polymer. In particular, the fibres exhibit a high tenacity value and yet maintain a good elongation at break value.

Said copolymers have also the advantage of good workability due to a broad spinnability window, which allows for a wider range of the temperature at which the spinning is carried out.

According to the present invention there is provided thermally bondable fibres comprising semicrystalline random copolymers (A) of propylene, 1-hexene and, optionally, another α-olefin, the amount of 1-hexene being from 0.75 to less 1.52 mol % (i.e. 1.5 to less than 3 wt %) with respect to the total weight of the copolymer. The said copolymers possess a value of melt flow rate (MFR) ranging from 4 to 35 g/10 min, preferably 8-20 g/10 min, and a molecular weight distribution, in terms of the ratio between weight average molecular weight and numeric average molecular weight ($\overline{M}_w/\overline{M}_n$), ranging from 4 to 12, preferably from 5 to 9.

Copolymers (A) have stereoregularity of isotactic type.

From the above definition, it is evident that the term "copolymer" includes polymers containing more than one kind of comonomers, such as terpolymers.

Typically, said copolymers (A) exhibit at least one of the following features:
 a melting temperature of or above 140° C., such as from 140 to 155° C.; and
 a solubility in xylene at room temperature (i.e. about 25° C.) below 10 wt %, preferably below 5 wt %, more preferably below 3 wt %.

Typically, copolymers (A) have a polydispersity index from 3 to 7, more preferably from 3 to 5.

The fibre according to the present invention typically exhibits a value of tenacity higher than 20 cN/tex and a value of elongation at break higher than 150%.

It is found that the fibre of the present invention also possesses good bonding force at 145° C. that is at least 300 cN and tensile strain recovery that is at least 85%.

Typically, the fibres according to the present invention have a titre ranging from 1 to 8 dtex, preferably 1.5 to 4 dtex.

The further α-olefin optionally present in the copolymer is selected from ethylene and α-olefins of formula $CH_2=CHR$, wherein R is a $C_2$-$C_8$ linear or branched alkyl radical. The said optionally olefin is preferably in amounts ranging from 0.5 to 4.5% by weight with respect to the total copolymer.

According to a particular embodiment of the present invention, the thermal bondable fibers further comprise 0.5% to 80%, more preferably from 0.5% to 60% by weight, in particular from 0.5% to 50% by weight, most preferably from 0.5% to 30% by weight of a polyolefin (B) (different from random copolymer (A), in particular as regards the content of comonomers, i.e. not falling in the previously given definition of random copolymer (A)) in addition to copolymer (A).

When polyolefin (B) is present, the fibers are made from a polyolefin composition (C) containing from 20% to 100% by weight, more preferably from 40% to 100% by weight, in particular from 50% to 100% by weight, most preferably from 70% to 100% by weight of the above-mentioned random copolymer (A) and the above-mentioned amounts of polyolefin (B). Polyolefin composition (C) can be prepared by the well-known methods, for example by mechanically blending the copolymer (C) and polyolefin (B).

Generally, said polyolefin (B) is selected from polymers or copolymers, and their mixtures, of $CH_2=CHR$ olefins where R is a hydrogen atom or a $C_1$-$C_8$ alkyl radical. Particularly preferred are the following polymers:

1) isotactic or mainly isotactic propylene homopolymers, and homopolymers or copolymers of ethylene, like HDPE, LDPE, LLDPE;
2) crystalline copolymers of propylene with ethylene and/or $C_4$-$C_{10}$ α-olefins, such as for example 1-butene, 1-hexene, 4-methyl-1-pentene, 1-octene, wherein the total comonomer content ranges from 0.05% to 20% by weight with respect to the weight of the copolymer (said copolymers being different from the random copolymer (A) as regards the content of comonomers, in particular containing less than 3%, preferably less than 2.5% by weight of $C_4$-$C_{10}$ α-olefins and/or more than 1%, preferably more than 2% by weight of ethylene), or mixtures of said copolymers with isotactic or mainly isotactic propylene homopolymers;
3) elastomeric copolymers of ethylene with propylene and/or a $C_4$-$C_{10}$ α-olefin, optionally containing minor quantities (in particular, from 1% to 10% by weight) of a diene, such as butadiene, 1,4-hexadiene, 1,5-hexadiene, ethylidene-1-norbornene;
4) heterophasic copolymers comprising (I) a propylene homopolymer and/or one of the copolymers of item 2), and an elastomeric fraction (II) comprising one or more of the copolymers of item 3), typically prepared according to known methods by mixing the components in the molten state, or by sequential polymerization, and generally containing the elastomeric fraction (II) in quantities from 5% to 80% by weight;

5) 1-butene homopolymers or copolymers with ethylene and/or other α-olefins.

Moreover, the fibers of the present invention may be single (monocomponent) fibers (i.e. substantially made of the said random copolymer (A) or of a composition comprising the random copolymer, like said composition (C)) or composite fibers (i.e. comprising one or more additional portions arranged symmetrically or asymmetrically, for instance side-by-side or sheath-core, comprising various and different kinds of polymeric materials).

Preferred examples of polymeric materials that can constitute or be present in the said additional portions are polyethylene, polyisobutylene, polyamides, polyesters, polystyrene, polyvinyl chloride, polyacrylates and mixtures thereof.

The fibers of the present invention can contain formulations of stabilizers suited for obtaining a skin-core structure (skin-core stabilization), or a highly stabilizing formulation. In the latter case, a superior resistance to aging is achieved for durable nonwovens.

The copolymer of the present invention can be prepared by polymerisation in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at room temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are 1,3-diethers of formula:

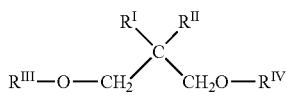

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si(OCH$_3$)$_2$, (cyclohexyl)(methyl)Si (OCH$_3$)$_2$, (cyclopentyl)$_2$Si(OCH$_3$)$_2$, (phenyl)$_2$Si(OCH$_3$)$_2$ and (1,1,2-trimethylpropyl) Si(OCH$_3$)$_3$, which is preferred.

1,3-diethers having the formulae described above can also be used advantageously. If the internal donor is one of these diethers, the external donors can be omitted In particular, even if many other combinations of the previously said catalyst components may allow to obtain propylene polymer compositions according to the present invention, the random copolymers are preferably prepared by using catalysts containing a phthalate a inside donor and (cyclopentyl)$_2$Si(OCH$_3$)$_2$ as outside donor, or the said 1,3-diethers as inside donors.

The copolymers according to the present invention are produced in accordance with known polymerisation processes.

For example, a polymerisation process is carried out in one or more stage(s). In case the two or more stages of polymerisation are carried out, the copolymers are prepared in sequential stages. In each stage the operation takes place in the presence of the copolymer obtained and the catalyst in the preceding stage.

According to another polymerisation process the copolymers are produced by a polymerisation process carried out in at least two interconnected polymerisation zones.

The process according to the preferred process is illustrated in EP application 782 587.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the copolymers and the gaseous mixture leaving the riser are conveyed to a solid/gas separation zone. The solid/gas separation can be effected by using conventional separation means. From the separation zone, the copolymers enter the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the copolymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The copolymers and polymer compositions may be blended with additives commonly employed in the art, such as nucleating agents, colorants and fillers in addition to the above-mentioned stabilisers.

The fibres of the present invention can be prepared by way of any known melt spin process. In particular, they can be prepared in form of staple fibres, by using both long-spinning and short-spinning apparatuses.

The long-spinning apparatuses normally comprise a first spinning section where the fibres are extruded and air-cooled in a quenching column at a relatively high spinning speed. Subsequently, these fibres go to the finishing step, during which they are drawn, crimped-bulked and cut. Generally, the above mentioned finishing step is carried out separately with respect to the spinning, in a specific section where the fibre rovings are gathered into one single big roving. Said big roving is then sent to drawing, crimping-bulking and cutting apparatuses which operate at a speed ranging from 100 to 200 m/min.

In other types of long-spinning apparatuses the above mentioned finishing steps are carried out in sequence with the spinning step. In this case the fibres go directly from the gathering to the drawing rollers, where they are drawn.

The process conditions generally adopted when using the long-spinning apparatuses are the following:
  output per hole: greater than 0.1 g/min, preferably from 0.15 to 1 g/min, more preferably from 0.3 to 0.7 g/min;
  take up speed: equal to or higher than 500 m/min, preferably from 500 to 3500 m/min, more preferably from 600 to 2000 m/min;
  space where the fibres cool off and solidify after exiting the die: greater than 0.50 m. Moreover, it is preferable that the draw ratio be from 1.1 to 4.

For further details on the long-spinning apparatuses reference is made to Friedelm Hauser "Plastics Extrusion Technology", Hauser Publishers, 1988, chapter 17.

The short-spinning apparatuses allow for a continuous operation, since the spinning speed is compatible with the drawing, crimping and cutting speeds.

The process conditions which are best suited to be used according to the present invention using short-spinning apparatuses are the following. The output per hole ranges from 0.005 to 0.18 g/min, preferably from 0.008 to 0.07 g/min, more preferably from 0.01 to 0.03 g/min. The take up speed ranges from 30 to 300 m/min, preferably from 100 to 300 m/min. The draw ratios range from 1.1 to 3.5, preferably from 1.2 to 2.5. Moreover, the fibre cooling and solidification space at the output of the die (cooling space) is preferably greater than 2 mm, more preferably greater than 10 mm, in particular from 10 to 350 mm. Said cooling is generally induced by flow.

For further details on the short-spinning apparatuses reference is made to M. Ahmed, "Polypropylene fibres science and technology", Elsevier Scientific Publishing Company (1982) pages 344-346.

The copolymers and compositions according to the present invention can be spun in a range of temperatures for the above long-spinning and short-spinning apparatuses generally varying from 2500 to 300° C. In particular, the spinning temperature window can range from 265° to 290° C. without negatively affecting the capability of the fibre to bond each other.

As mentioned above, the fibres of the present invention are particularly suited for preparing thermally bonded articles, in particular non-woven fabrics.

The thermally bonded articles may comprise two or more non-woven layers. Thanks to the use of the fibres of the present invention a good adhesion among the layers is obtained.

The said articles are produced by thermal bonding processes carried out according to well-known methods.

The following examples are given to illustrate the present invention without limiting purpose.

The data relating to the polymeric materials and the fibres of the examples are determined by way of the methods reported below.

Melting temperature: Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, temperatures corresponding to peaks are read.

Melt Flow Rate: Determined according to ISO method 1133 (230° C., 2.16 kg).

Solubility in xylene: Determined as follows. 2.5 g of polymer and 250 ml of xylene are introduced in a glass flask equipped with a refrigerator and a magnetical stirrer. The temperature is raised in 30 minutes up t the boiling pint of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Intrinsic viscosity (IV): Determined in tetrahydronaphthalene at 135° C.

1-hexene content: Determined by IR spectroscopy.

$\overline{M}_w$ and $\overline{M}_n$: Measured by way of Gel Permeation Chromatography (GPC) in tetrachlorobenzene.

Polydispsersity Index (PD: Determined according to ISO 6721-10 method. PI is calculated by way of a dynamic test carried out with a RMS-800 rheometric mechanical spectrometer. The PI is defined by the equation $PI=10^5/Gc$, where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200 C after 90 minutes. At this temperature one carries out the test where G' and G" are measured in function of the frequency.

Titre of fibres: from a 10 cm long roving, 50 fibres are randomly chosen and weighed. The total weight of the said 50 fibres, expressed in mg, is multiplied by 2, thereby obtaining the titre in dtex.

Tenacity and elongation at break: from a 500 m roving a 100 mm long segment is cut. From this segment the single fibres to be tested are randomly chosen. Each single fibre to be tested is fixed to the clamps of an Instron dinamometer (model 1122) and tensioned to break with a traction speed of 20 mm/min for elongations lower than 100% and 50 mm/min for elongations greater than 100%, the initial distance between the clamps being of 20 mm. The ultimate strength (load at break) and the elongation at break are determined. The tenacity is derived using the following equation:

Tenacity=Ultimate strength ($cN$)×10/titre (dtex)

Bonding force: specimens are prepared from a 400 tex roving (method ASTM D 1577-7) 0.4 meter long, made up of continuous fibres. After the roving has been twisted eighty times, the two extremities are united, thus obtaining a product where the two halves of the roving are entwined as in a rope. The thermal bonding is carried out on said specimen using a Bruggel HSC-ETK thermal bonding machine, operating at various plate temperatures (see in the tables) using a clamping pressure of 0.28 MPa and 1 second bonding time. The previously said dynamometer, operated at a traction speed of 2 cm/min, is used to measure the average force required to separate the two halves of the roving which constitute each specimen at the thermal bonding point. The obtained graph shows the force varying from minimum to maximum values (peaks are obtained). The value resulting from averaging out all the minimum and maximum values shown in the graph represents the said average force. The result, expressed in cN, is obtained by averaging out at least eight measurements, and represents the bond strength of the fibres.

Tensile Strain Recovery: The test is based on ASTM method D-1774-64. The method concerns procedures for the measurements of the elastic behaviour of fibres by assessing their ability to recover strain or their original dimension following a known extension. The multifilament sample subjected to the test is 40 cm length and has a titre of 500 dtex. The operative conditions are reported in the following table A.

TABLE A

| | Fibres Preparation | |
|---|---|---|
| Spinnerette | Holes, No. | 61 |
| | Diameter, mm | 0.4 |
| | Length/diameter ratio | 5 |
| | Spinning Conditions | |
| Output, g/min × hole | | 0.4 |
| Spinning Speed First Godet, m/min | | 1500 |
| On Line Stretching Ratio | | 1:1.5 |
| Take up Wind Speed, m/min | | 2250 |
| | Dynamometer Test Conditions | |
| Clamp Distance[1], mm | | 200 |
| Maximum Strain Applied, % | | 10 |
| Strain Speed, mm/min | | 20 |
| Hysteresis procedure | | according to ASTM method 1774-64 |

[1]10% clamp distance/min

EXAMPLE 1

Preparation of the Solid Catalyst Component

Into a 500 mL four-necked round flask, purged with nitrogen, 250 mL of $TiCl_4$ are introduced at 0° C. While stirring, 10.0 g of microspheroidal $MgCl_2.2.8C_2H_5OH$ (prepared according to the method described in example 2 of U.S. Pat. No. 4,399,054 but operating at 3000 rpm instead of 10000 rpm), 9.1 mmol diisobutylphthalte as internal electron-donor compound is added. The temperature is raised to 100° C. and maintained for 120 min. Then, the stirring is discontinued, the solid product is allowed to settle and the supernatant liquid is siphoned off. Then 250 ml of fresh $TiCl_4$ are added. The mixture is reacted at 120° C. for 60 min and, then, the supernatant liquid is siphoned off. The solid is washed six times with anhydrous hexane (6×100 ml) at 60° C.

The solid catalyst component is used with dicyclopentyldimethoxysilane (DCPMS) as external-donor component and triethylaluminium.

Polymerization

Copolymers are prepared by polymerising propylene and hexene-1 in the presence of the above catalyst under continuous conditions in a plant comprising a gas-phase polymerisation apparatus. The apparatus comprises two interconnected cylindrical reactors (riser and downcomer). Fast fluidisation conditions are established in the riser by recycling gas from the gas-solid separator.

The polymer composition shows a narrow distribution of the molecular weights obtained without using a liquid barrier, the hydrogen concentration is kept at the same concentration in both riser and downcomer and the hexene-1 is fed only into the downcomer.

The polymer particles exiting the reactor are subjected to a steam treatment to remove the reactive monomers and volatile substances and then dried.

Other operative conditions and the properties of the produced copolymer are indicated in Table 1.

TABLE 1

|  | Example 1 |
|---|---|
| Polymerisation Conditions |  |
| Temperature, ° C. | 85 |
| Pressure, bar | 30 |
| $C_6^-/(C_6^- + C_3^-)$ (riser), mol/mol | 0.031 |
| Properties of the Polymer |  |
| Hexene-1 Content, mol % (wt %) | 1.47 (2.9) |
| Melt Index, dg/min | 10.1 |
| $\overline{M}_w/\overline{M}_n$ ratio | 6.9 |
| Polidispersity Index | 3.7 |
| Melting Temperature, ° C. | 144 |
| Xylene-Soluble Content, wt % | 2.2 |

EXAMPLES 2-5

The copolymers of example 1 are stabilised by adding a stabiliser package suitable for thermal bonding applications. Then they are spun to produce fibres. The spinnability tests are carried out at different temperatures and spinning speed in thermal bonding standard conditions. The draw ratio is 1.5. The spinning conditions and the proprieties of the fibres thus obtained are reported in Table 2.

COMPARATIVE EXAMPLES 1-2 (1c-2c)

Commercial polymers for fibres are spun into fibres according to example 2. The spinning conditions and the proprieties of the fibres thus obtained are reported in Table 2.

The data in Table 2 show that the fibres according to the present invention exhibit a broader spinning temperature window and both high values of elongation at break and high values of tenacity contrary to the comparison fibres prepared with commercial polymers. The other properties are comparable to or even a little better than those of the comparison fibres.

TABLE 2

|  | Examples | | | | Comparative Examples | |
|---|---|---|---|---|---|---|
|  | 2 | 3 | 4 | 5 | 1c[1] | 2c[2] |
| Operative Conditions |  |  |  |  |  |  |
| Spinning Temperature,° C. | 280 | 285 | 275 | 270 | 280 | 280 |
| Maximum Spinning Speed, m/min | 3300 | 3600 | 3600 | — | 3600 | 3300 |
| Properties of the Fibre |  |  |  |  |  |  |
| Titre, dtex | 1.95 | 1.95 | 2.05 | 1.9 | 1.8 | 1.9 |
| Tenacity, cN/tex | 33.3 | 33.1 | 33.0 | 22.1 | 19.4 | 43.6 |
| Elongation at Break, % | 170 | 195 | 210 | 205 | 225 | 90 |
| Bonding Force at 150° C., cN | 470 | 625 | — | 365 | 415 | 375 |
| Bonding Force at 145° C., cN | 405 | 345 | 400 | 320 | — | 350 |
| Tensile Strain Recovery, % | 87.8 | 87.3 | 89.4 | 90.2 | 82.7 | 81.3 |

[1]Isotactic propylene homopolymer having MFR of 13 dg/min, 3.5% of polymer fraction soluble in xylene at room temperature and a $\overline{M}_w/\overline{M}_n$ ratio of 6.68.
[2]Isotactic propylene homopolymer having MFR of 12 dg/min, <1% of polymer fraction soluble in xylene at room temperature and a $\overline{M}_w/\overline{M}_n$ ratio of 2.

The invention claimed is:

1. A fibre for thermal bonding comprising semicrystalline random copolymers of propylene, 1-hexene and optionally another α-olefin, the amount of 1-hexene being from 0.75 to less than 1.52 mol % with respect to the total weight of the copolymer, the copolymers possessing a value of melt flow rate (MFR) ranging from 4 to 35 g/10 mm and a molecular weight distribution, in terms of the ratio between weight average molecular weight and numeric average molecular weight ($\overline{M}_w/\overline{M}_n$), ranging from 4 to 12, wherein the semicrystalline random copolymers are prepared by polymerization in the presence of Ziegler-Natta catalysts,
wherein the semicrystalline random copolymers have a melting point of above 140° C.

2. The fibre of claim 1 wherein the copolymer has a molecular weight distribution from 5 to 9.

3. The fibre of claim 1 wherein the copolymer has a solubility in xylene at room temperature below 10 wt %.

4. The fibre of claim 1 further comprising up to 80% by weight of polyolefin (B) selected from polymers or copolymers, and their mixtures, of $CH_2$=CHR olefins where R is a hydrogen atom or a $C_1$-$C_8$ alkyl radical.

5. Non-woven fabric obtained from a fibre comprising semicrystalline random copolymers of propylene, 1-hexene and optionally another α-olefin, the amount of 1-hexene being from 0.75 to less than 1.52 mol % with respect to the total weight of the copolymer, the copolymers possessing a value of melt flow rate (MFR) ranging from 4 to 35 g/10 mm and a molecular weight distribution, in terms of the ratio between weight average molecular weight and numeric average molecular weight ($\overline{M}_w/\overline{M}_n$), ranging from 4 to 12, wherein the semicrystalline random copolymers are prepared by polymerization in the presence of Ziegler-Natta catalysts, and the semicrystalline random copolymers have a melting point of above 140° C.

6. The fibre of claim 1 wherein the copolymer has a molecular weight distribution ranging from greater than 5 to 12.

7. The fibre of claim 1 wherein the copolymer has a molecular weight distribution ranging from 6 to 12.

8. The fibre of claim 1 comprising semicrystalline random copolymers of propylene, 1-hexene and an α-olefin present in amounts ranging from 0.5 to 4.5% by weight with respect to the total copolymer selected from ethylene and α-olefins of formula $CH_2$=CHR, wherein R is a $C_2$-$C_8$ linear or branched alkyl radical.

9. The fibre of claim 4, wherein polyolefin (B) is selected from:
1) copolymers of ethylene selected from HDPE, LDPE, or LLDPE,
2) crystalline copolymers of propylene with ethylene and/or $C_4$-$C_{10}$ α-olefins selected from 1-butene, 1-hexene, 4-methyl-1-pentene, or 1-octene, wherein the total comonomer content ranges from 0.05% to 20% by weight with respect to the weight of the copolymer,
3) elastomeric copolymers of ethylene with propylene and/or a $C_4$-$C_{10}$ α-olefin, optionally containing minor quantities of a diene, such as butadiene, 1,4-hexadiene, 1,5-hexadiene, ethylidene-1-norbornene,
4) heterophasic copolymers comprising (I) a propylene homopolymer and/or one of the copolymers of item 2), and an elastomeric fraction (II) comprising one or more of the copolymers of item 3), containing the elastomeric fraction (II) in quantities from 5% to 80% by weight, or
5) 1-butene homopolymers or copolymers with ethylene and/or other α-olefins.

* * * * *